United States Patent [19]

Hanna

[11] 4,134,564
[45] Jan. 16, 1979

[54] PANEL SYSTEM AND COMPONENTS

[76] Inventor: Gary D. Hanna, 6 Shamokin Dr., Don Mills, Ontario, M3B 2V1

[21] Appl. No.: 759,442

[22] Filed: Jan. 14, 1977

[51] Int. Cl.² .................................................. A47G 29/02
[52] U.S. Cl. .................................... 248/243; 248/224.4; 160/351; 403/353; 403/255; 108/110
[58] Field of Search ............... 248/220.2, 221.3, 222.1, 248/224.4, 239, 243, 244, 245, 246; 403/353, 255, 254; 211/190, 208; 52/36, 239, 486, 495, 710; 160/135, 351; 108/110, 111; 312/195, 263

[56] References Cited

U.S. PATENT DOCUMENTS

| 843,456 | 2/1907 | Higbee | 403/353 |
|---|---|---|---|
| 2,642,249 | 6/1953 | Samuels | 248/224.4 |
| 2,682,322 | 6/1954 | Bloedow | 85/32 V |
| 3,156,282 | 11/1964 | Bedford | 403/254 |
| 3,188,037 | 6/1965 | Hinrichs | 248/220.2 |
| 3,269,553 | 8/1966 | Ruhnke | 248/243 |
| 3,564,666 | 2/1971 | Dold | 85/32 V |
| 3,572,626 | 3/1971 | Bertschi | 248/243 |
| 3,599,919 | 8/1971 | Bobrowski | 108/110 |
| 3,908,320 | 9/1975 | Hogue | 248/243 |
| 4,026,084 | 5/1977 | Goose | 403/255 |

FOREIGN PATENT DOCUMENTS

| 1214844 | 4/1966 | Fed. Rep. of Germany | 248/243 |
|---|---|---|---|
| 566714 | 9/1957 | Italy | 403/353 |
| 680327 | 10/1952 | United Kingdom | 248/243 |
| 785666 | 10/1957 | United Kingdom | 85/1 H |
| 809243 | 2/1959 | United Kingdom | 248/243 |
| 1261511 | 1/1972 | United Kingdom | 248/243 |

Primary Examiner—Marion Parsons, Jr.
Attorney, Agent, or Firm—Murray & Whisenhunt

[57] ABSTRACT

A fastener for use in display stands and partitions is provided for securing a pair of elements one to the other. One element is provided with a slot and the fastener is secured to the remaining element.

The fastener is generally hook-shaped and is provided with a cam surface which engages with the rear surface of the slotted element to effect engagement. In an alternative embodiment, the fastener has two projections which engage the adjacent surface of the slotted element to urge the two elements together through the opposing action of the hook member projections and the surfaces with which they abut.

3 Claims, 6 Drawing Figures

U.S. Patent    Jan. 16, 1979    Sheet 2 of 3    4,134,564
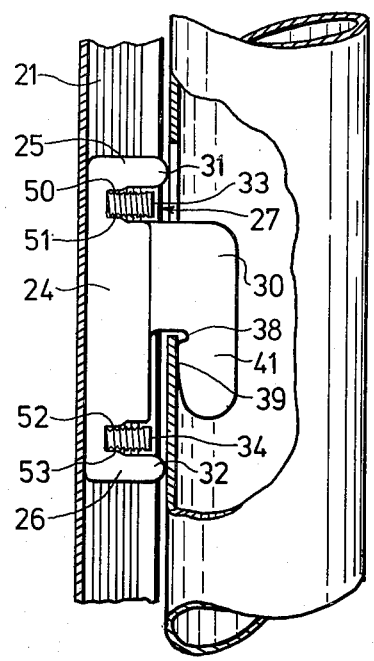
FIG.3.
FIG.4.
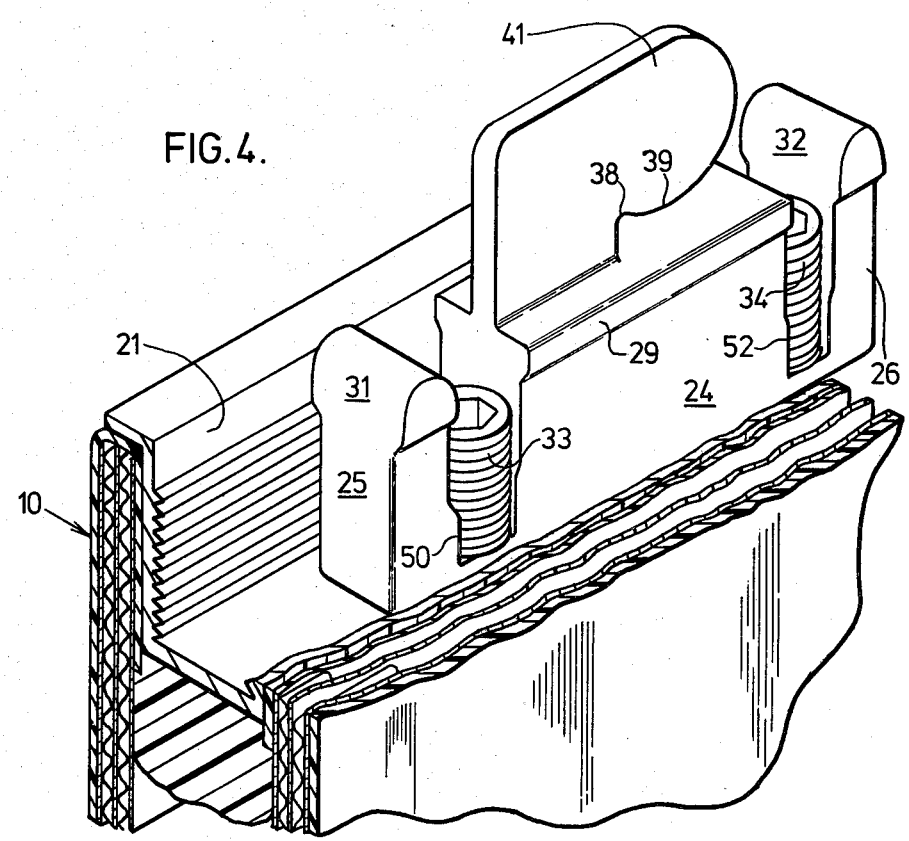

PANEL SYSTEM AND COMPONENTS

This invention relates to display stands and more particularly to components for such display stands as permit them to be easily assembled and disassembled.

BACKGROUND OF THE INVENTION

In British Pat. No. 1,311,761 entitled Display Stand, published Mar. 28, 1973, there is described a knockdown display stand system which comprises rectangular panels and posts. The posts are provided with slots, and hooks, engageable with these slots, are mounted to extend outward of the periphery of the panels to engage the slots. These systems are principally intended as display panels but they can, as is apparent, be used for many applications such as room dividers.

Such systems have several shortcomings: the panels are normally constructed of material of substantial weight which increases the difficulty of handling, shipping and costs; the fasteners which serve to secure the panels to the support elements are expensive to install and unsightly, and they are subject to the further criticism that the junctions which are effected between the structural element and the panels are not too firm.

SUMMARY OF THE INVENTION

To overcome the various shortcomings in the prior art as known to the present inventor, there is accordingly provided in the present invention a fastener for use in such panelled system which enables panels to be assembled and disassembled in any desired configuration to their respective support panels while remaining pleasing to the eye.

The fastener is simple to install in that it can be secured to the panel after assembly, and when engaged with the support posts or structural elements, makes a positive connection such that there is minimal noise in use and installation. Previous structures had a tendency to rattle.

The fastener, more particularly, is provided with a body which is seated and secured in a channel which surrounds the periphery of the panel. From this body, a hook-shaped arm projects to engage slots on the structural supporting member. On either side of the hook, there is a projection which extends beyond the outer limit of the channel. The edge or surface of the hook adjacent to the channel has a cam-shaped form so that when engagement between the hook and the structural member is achieved, the panel and the structural member are urged together by the cam-surface engaging the remote side of the support member and held in a slightly spaced apart attitude by the projections engaging the outer surface of the support member.

It will be understood that the bias or strength of the relative urging between the components will be dependent upon the material employed as the fastener, the configuration of the cam surface and the dimensions and spacing of the projections from and relative to the hook-shaped member.

These and other advantages of the invention will be more apparent from the following description in which a preferred embodiment is described by way of example, and in which:

FIG. 3 is a diagrammatic section through a support post, fastener and panel showing the interrelationship between the various components;

FIG. 4 is a general perspective view, partly fragmented, showing the relationship between the panel and a fastener in accordance with the present invention;

Figure 1:
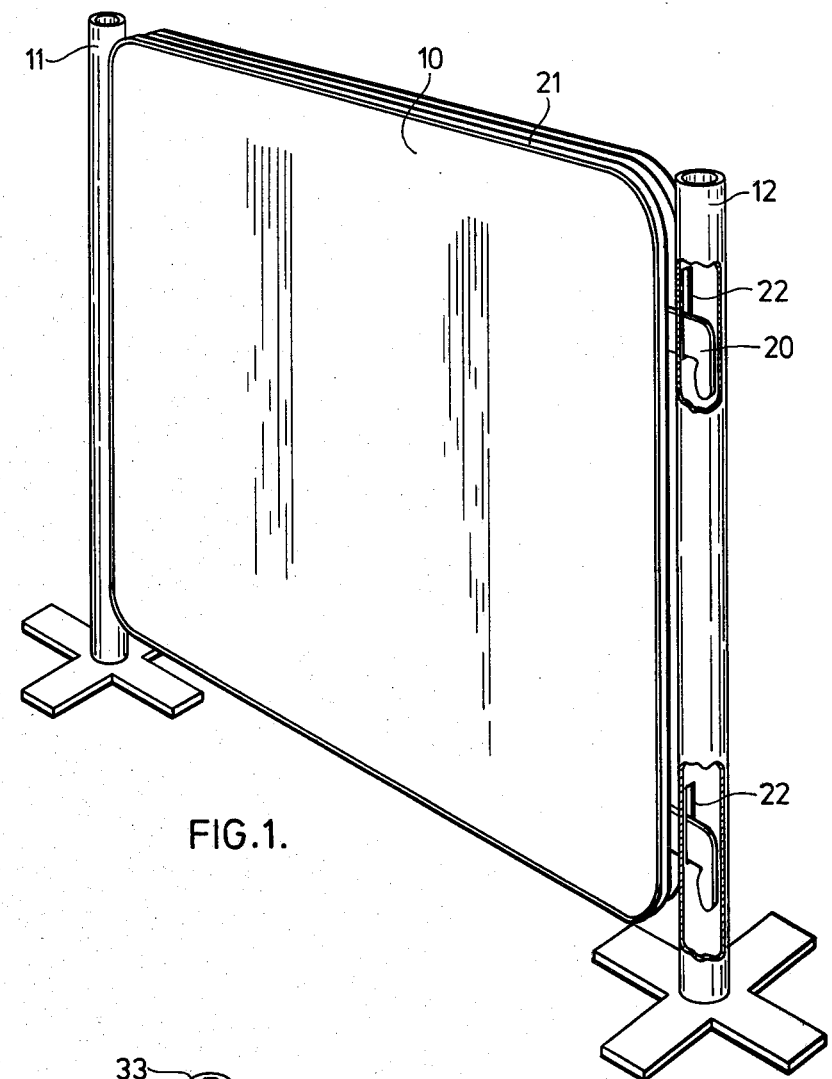
FIG. 1 is a general perspective view of a panel assembly in accordance with the present invention, partly broken away, illustrating the relationship between the support posts, panels and fasteners which are the subject of the present invention.

Referring now to the drawings, in FIG. 1, there is illustrated a general perspective view showing a panel 10, which is supported by a pair of vertical posts 11 and 12. The connection between these vertical posts and the panel 10 is accomplished by means of fasteners such as 20 which constitutes the subject matter of the present invention.

It will be observed that panel 10 is surrounded on its periphery by a channel generally indicated at 21. The fasteners such as 20 are mounted within this channel in the manner which will be described presently and engage slots such as 22 on post 12.

Figure 2:
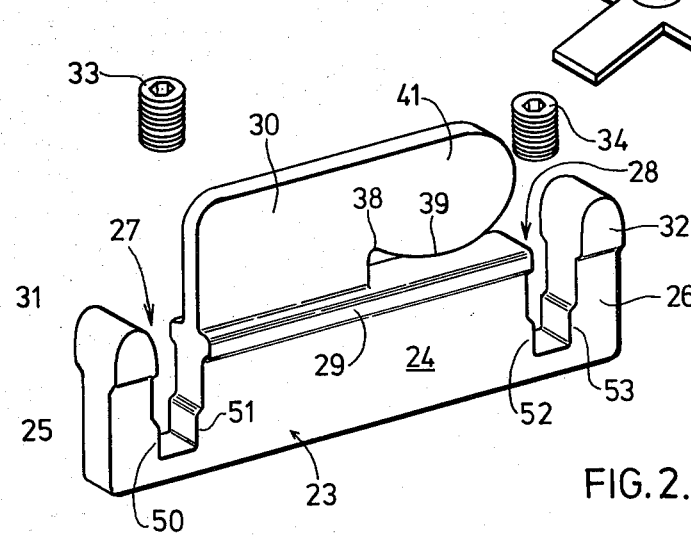
FIG. 2 is an enlarged, partly exploded view, of a fastener in accordance with the present invention.

As is illustrated in FIG. 2, a fastener in accordance with the present invention comprises a main body 23, which has a width such that it will slide within the channel such as 21.

Body 23 comprises a central portion 24, two terminal portions 25 and 26 which are spaced apart from but connected to the central portion 24 to define a pair of screw-receiving recesses 27 and 28.

These screw-receiving recesses 27 and 28 are provided with steps such as 50 and 51 and 52 and 53, respectively. These steps serve to lock the screws when they are secured down. The interaction between the screw threads and the plastic steps binds the screws and prevents their being shaken loose.

The central body portion 24 is provided with laterally extending flanges such as 29 on each other side thereof, and from the centre of the top surface of body portion 24 a hook-shaped arm 30 extends upwardly and along the main axis thereof.

The two remaining body portions, 25 and 26, are each provided with projections, 31 and 32. The screws which are employed are normal-set screws such as 33 and 34 which are normally seated with a tight fit in their respective recesses 27 and 28.

It will be observed from FIGS. 3 and 4 that the channels 21 have lateral flanges adjacent to the top end and are provided with threads on the internal vertical walls. The lateral flanges 29 on body portion 24 normally sit with their lower surfaces upon the uppermost limit of the threads so that the upper surface of the body portion 24 is flush or slightly below the upper outer limits of the channels 21.

The projections 31 and 32 on the respective body portions 25 and 26, however, project beyond the upper outer limits of the channel for a short distance.

It will be observed that the hook-shaped number 30 has an arm section 41 which extends substantially parallel to, or along the main axis of the body 24. This arm 21 has a cam-shaped surface 39 on the side adjacent to the channel 21 and a detent 38, at its innermost end, so that it will define a wide open mouth of decreasing width with the innermost detent 38.

Figure 6:
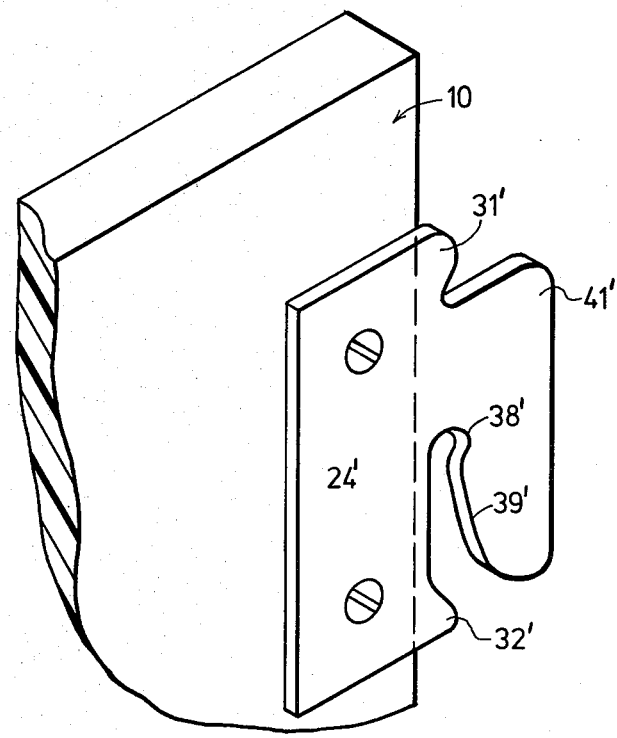
FIG. 6 is a perspective view illustrating a further embodiment of a fastener in accordance with the present invention mounted in an alternate manner on a panel.

In the embodiment illustrated in FIG. 6, the corresponding parts are illustrated with corresponding prime numbers.

It is to be noted that the fastener is secured to the panel by screws which are passed through the fastener and engage the panel. No channel is provided.

As with the embodiments illustrated in the remaining drawings the hook-shaped member 41', has a cam-shaped surface 39', adjacent to the adjacent panel side. The projections 31' and 32' also correspond and care should be taken to ensure that these extend beyond the panel edge. This fastener may, as will be apparent, be stamped from metal, or be of plastic.

USE OF THE INVENTION

Normally the display panels and their supports are shipped to the location in which they are to be employed in a knocked-down condition and in this condition, for facility of transportation, the fastening means are unmounted. At the site, the fastening means are inserted in the channels by merely slipping them into position and aligned with the slots on the vertical posts with which they are to be engaged. The set screws 33 and 34 are then placed into position. In the preferred attitude, the body 24 sits in the channel with the flanges 29 engaging the uppermost thread. As the set screws 33 and 34 are tightened, then the serrations on the screws will engage the threads on either side of the channel so as to secure the fastener firmly in position.

At this point the arm 30 is passed through the slots. such as 20 in the vertical posts and pushed downward. As the arm 30 is pushed downward, the cam surface 39, engages the rear surface of the post and urges the post and panel together in secure engagement. This action permits the securement to be firm. At the same time, the projections 31 and 32 engage the other surface of the tube, and serve to counter any relative motion between the posts and the panel.

In the embodiments illustrated, it will be observed that the fastener is nylon. It will, of course, be understood that any other equivalent material may also be employed for the same purposes.

It will also be apparent that instead of hollow posts, other structural supports of alternate forms such as square tubes, slotted plates or the like may be employed.

Figure 5:
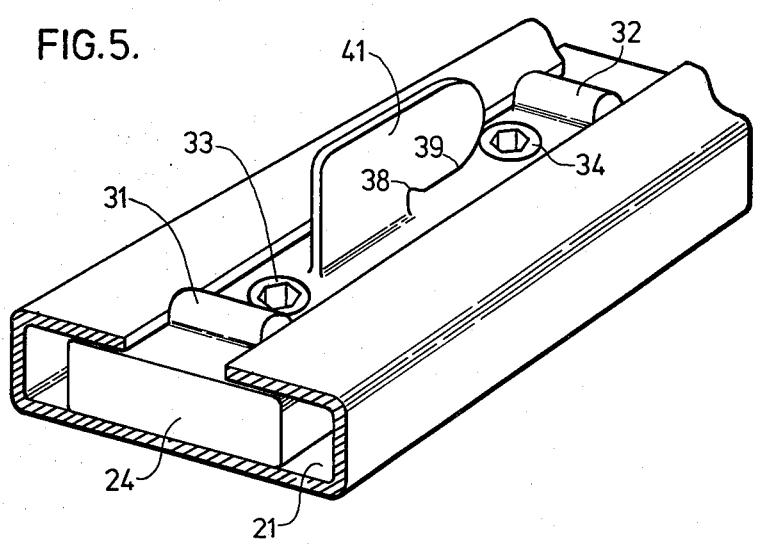
FIG. 5 is an alternate fastener structure for use with an alternate form of peripheral channel.

In FIG. 5, the channel 21 has no threading on the sidewalls but is provided with overhanging lips. The fastener 23 is also modified in that the screws 33 and 34 engage internal threads on the fastener which pass through the fastener body. In this fashion these screws pass through to engage the bottom channel wall and urge the fastener into engagement with the downwardly facing channel walls.

The interaction of the fastener of FIG. 6 with the structural element will, of course, be the same as that of the remaining fasteners hereinbefore described.

The embodiments of the invention in which an exclusive property or privilege is claimed are defined as follows:

1. A fastener for securing a panel to a hollow structural element having a slot and an outer surface and an inner surface, said panel having a channel extending around at least part of the periphery thereof, said channel having an outer limit, said fastener having a unitary structure and comprising a body means securable within said channel for engaging said panel, a hook-shaped member means and two projection means projecting from said body means beyond said channel outer limit when said body means is secured within said channel, said projection means being in spaced apart longitudinal alignment on opposite sides of said hook-shaped member means, said hook-shaped member means including a cam-shaped surface means facing said channel and spaced apart from said channel outer limit when said body means is secured within said channel, said cam-shaped surface having a shape defining with said channel outer limit a passage with a wide mouth and a decreasing width rearwardly of said mouth whereby said cam-shaped surface engages said inner surface of said structural element, during relative longitudinal fastening movement between the fastener and the panel on the one hand and the structural element on the other hand after insertion of said hook-shaped member means into said slot, to pull said fastener body and said panel towards said structural element, and each said projection means being longitudinally spaced from said cam-shaped surface so as to be pulled against said outer surface of the structural element during said relative longitudinal fastening movement to provide resistance to relative movement between the panel and the structural element.

2. A fastener as claimed in claim 1 wherein said channel has opposed walls and said body means further includes a pair of spaced apart recesses one adjacent to each of said projection means, and removable threaded means mountable in said recesses for engagement with said channel walls.

3. A fastener as claimed in claim 1 wherein said projection means are wider than said slot in said structural element in a direction transverse to said relative longitudinal fastening movement.

* * * * *